United States Patent
Broecker

[15] 3,670,047
[45] June 13, 1972

[54] EPOXY RESINS ETHERIFIED WITH ETHYLENICALLY UNSATURATED ALCOHOLS AND COPOLYMERIZED WITH CARBOXY CONTAINING MONOMERS

[72] Inventor: Bernhard Broecker, Hamburg, Germany
[73] Assignee: Reichhold-Albert-Chemie Aktiengesellschaft, Hamburg, Germany
[22] Filed: Oct. 1, 1969
[21] Appl. No.: 862,939

[30] Foreign Application Priority Data
Oct. 8, 1968 Switzerland .......................... 15278/68

[52] U.S. Cl. ........................ 260/837 R, 117/123 D, 117/125, 117/132 BE, 117/148, 117/161 ZB, 260/23 EP, 260/41 A, 260/41 B, 260/41 R, 260/47 EP, 260/47 EE, 260/47 EN, 260/77.5 CR, 260/831, 260/834, 260/836
[51] Int. Cl. .................................................. C08g 45/04
[58] Field of Search .................... 260/836, 837, 80.76, 23 EP

[56] References Cited

UNITED STATES PATENTS

| | | | |
|---|---|---|---|
| 3,198,762 | 8/1965 | Maeder | 260/80.76 |
| 3,240,740 | 3/1966 | Knapp | 260/80.76 |
| 3,247,144 | 4/1966 | Masters | 260/837 |
| 3,247,286 | 4/1966 | Masters | 260/837 |
| 3,454,418 | 7/1969 | Forsberg | 260/837 |
| 2,824,850 | 2/1958 | Widmer | 260/23 EP |

FOREIGN PATENTS OR APPLICATIONS

| | | | |
|---|---|---|---|
| 774,420 | 5/1957 | Great Britain | 260/836 |
| 1,162,568 | 2/1964 | Germany | 260/836 |
| 1,163,550 | 2/1964 | Germany | 260/836 |
| 1,169,135 | 4/1964 | Germany | 260/836 |
| 1,203,474 | 10/1965 | Germany | 260/836 |

Primary Examiner—Paul Lieberman
Attorney—Krafft & Wells

[57] ABSTRACT

Water-dilutable vinyl modified polyether resins produced by etherifying an epoxide compound with an unsaturated monohydric alcohol containing at least one ethylenic double bond, copolymerizing the etherified product through its centers of unsaturation with an ehtylenically unsaturated carboxylic compound and neutralizing the copolymer wherein:

a. the epoxide compound is selected from the group consisting of

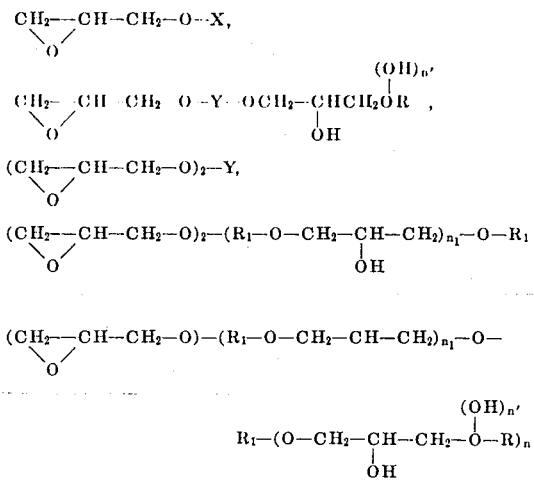

and wherein X is an alkyl, acrylic or cycloalkyl group,
Y is an alkylene, arylene or cycloalkylene group,
$n'$ is 0 or a small integer,
$n_1$ is 0 or a small integer,
$R_1$ is an aliphatic or aromatic group, and
R is an aliphatic or aromatic group.

b. the unsaturated monohydric alcohol has three to 20 carbon atoms and the etherification is carried out by heating, c. the carboxylic compound is an $\alpha,\beta$-ethylenically unsaturated monocarboxylic or polycarboxylic acid, an anhydride and/or a half ester with monoalcohols having one to four carbon atoms, optionally containing vinyl or vinylidene compounds, and the copolymerization reaction is carried out with heating so that the reaction products have an acid number of at least 25, and d. the neutralization is carried out in the presence of ammonia, strong organic nitrogen bases or mixtures thereof so that the reaction products are dispersible in or dilutable with water.

11 Claims, No Drawings

EPOXY RESINS ETHERIFIED WITH ETHYLENICALLY UNSATURATED ALCOHOLS AND COPOLYMERIZED WITH CARBOXY CONTAINING MONOMERS

CROSS-REFERENCES TO RELATED APPLICATIONS

Applicant claims priority under 35 U.S.C. 119 for application, Ser. No. 15278/68, filed in the Patent Office of Switzerland on Oct. 8, 1968.

Copending U.S. application, Ser. No. 780,583, filed Dec. 2, 1968 and having the title "Water-Dilutable Phenoplasts Having Carboxyl Groups" is incorporated by reference.

SUMMARY OF THE INVENTION

The field of the invention is coating compositions containing fat, fatty oil, fatty oil acids or salts thereof.

The present invention is particularly concerned with the manufacture of water-soluble synthetic resins based upon vinyl modified polyether resins.

The state of the prior art is set forth in Kirk-Othmer "Encyclopedia of Chemical Technology," 2nd Ed., Vol. 8 (1965), in the section entitled "Electrophoretic Deposition," pages 23–36; Vol. 8 (1965), in the section entitled "Epoxy Resins," pages 294–312, particularly pages 304–309 which disclose epoxy esters and their utility in protective coatings; Vol. 15 (1968), in the section entitled "Phenolic Ethers," pages 165–175, particularly page 173 where polyhydroxy ethers are disclosed; and Vol. 15 (1968), in the section entitled "Phenolic Resins," pages 176–207.

The state of the prior art may be further ascertained by reference to the book of Paquin, "Epoxide Compounds and Epoxide Resins," beginning at page 416, and published by Springer Verlag, Berlin, Göttingen, Heidelberg (1958); Swiss Pat. No. 456,814; U.S. Pat. No. 3,293,201 of Shahade et al. which issued Dec. 20, 1966; Austrian Pat. No. 180,407 which corresponds to the Australian Pat. No. 150,863 of Hoenel, West German Applications R 44 295, R 45 194, R 45 195, R 45 196, R 45 852 and French Pat. No. 1,544,219 based thereupon corresponding to U.S. application Ser. No. 668,695 of Kiessling et al., filed Sept. 18, 1967; and French Pat. No. 1,497,222.

The synthetic resins of the present invention contain free carboxylic end groups which, when neutralized with ammonia or a strong organic nitrogen base, are suitable for use as binders in water-dilutable surface coating compositions. Previously known commercial synthetic resins which can be diluted with water suffer from the great disadvantage that they are not storage-stable in aqueous solution. This is because the pH value of the neutralized products tends to drift into the acid region on storage and water-insoluble constituents are thereby formed.

Various attempts have been made to overcome this problem, without however complete success, for example, Swiss Pat. No. 456,814 discloses water-soluble stoving lacquers which are manufactured by etherifying a compound carrying epoxide groups with a half ether of a glycol and subsequently esterifying these ethers with maleic anhydride. The products described therein however also contain ester bonds in addition to the ether bonds and are therefore of only limited stability to alkaline aqueous solution. U.S. Pat. No. 3,293,201 of Shahade et al which issued Dec. 20, 1966 describes a water-soluble air-drying binder which is obtained by reaction of an oil-maleic anhydride adduct with the ester of an epoxide resin with an unsaturated fatty acid. The product again contains bonds which counteract the stability in alkaline aqueous solution.

According to the present invention there is provided a process for the production of a synthetic resin which comprises etherifying an epoxide compound with unsaturated monohydric alcohols containing at least one ethylenic double bond and having from 2 to 20 carbon atoms and copolymerizing the etherified product through its centers of unsaturation with an $\alpha,\beta$-ethylenically unsaturated mono- or polycarboxylic acid or an anhydride or half ester thereof in an amount such that the product has an acid number of at least 25.

By virtue of the fact that no ester groups are present, it is possible to prepare synthetic resins in accordance with the invention which exhibit a high degree of storage stability even in aqueous alkaline solution.

Preferably the epoxide compound should be of a low molecular weight, e.g. below 3,500.

Satisfactory epoxide compounds include those having the formulas:

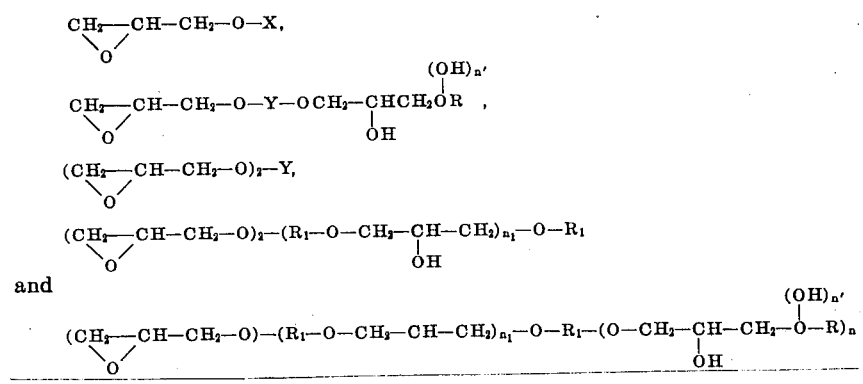

wherein X is an alkyl, aryl or cycloalkyl group having one to 20 carbon atoms,

Y is an alkylene, arylene or cycloalkylene group having one to 20 carbon atoms, $n'$ is 0 or a small integer of 1 to 4, $n_1$ is 0 or a small integer of 1 to 6, $R_1$ is an aliphatic or aromatic group having one to 15 carbon atoms, and R is an aliphatic or aromatic group having one to 15 carbon atoms.

DESCRIPTION OF THE PREFERRED EMBODIMENTS

Specific examples of suitable epoxide compounds include epoxidized olefines, diolefines and oligo-olefines such as 1,2,5,6-diepoxyhexane and 1,2,4,5-diepoxyhexane. These compounds are derived from glycols such as ethylene glycol, diethylene glycol, triethylene glycol, propylene glycol-1,2, propylene glycol-1,3, butylene glycol-1,4, pentane-diol-1,5, hexanediol-1,6 and especially diphenols such as resorcinol, pyrocatechol, hydroquinone, 1,4-dihydroxy-naphthalene, bis-(4-hydroxyphenyl)-methane, bis-4-(Hydroxyphenyl)-methyl phenylmethane, bis-(4-hydroxy-phenyl-tolyl)-methane, 4,4-dihydroxy-diphenyl and 2,2-bis-(4-hydroxy-phenyl)-propane. The polyethers containing epoxide groups possess the following general formula:

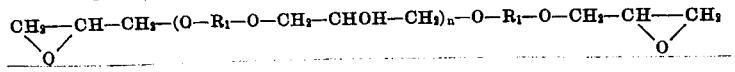

wherein $R_1$ denotes an aliphatic or aromatic carbon group having one to 15 carbon atoms and $n$ = zero or a small number, preferably 1 to 6. Compounds deserving very special emphasis are polyethers containing epoxide groups which have the general formula:

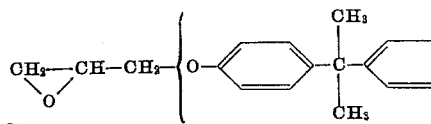 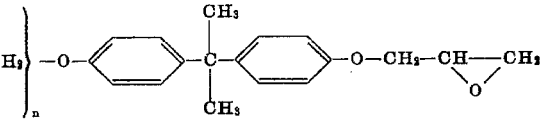

wherein $n$ = zero or a small number, preferably 1 to and which contain 2,2-bis-(4-hydroxyphenyl)-propane as the starting compound, and of these, polyethers with a molecular weight between about 380 and about 3,500 are again preferentially used.

For the etherification of these compounds containing epoxide groups, monoalcohols are employed which contain at least one ethylenic double bond. Preferably, however, alcohols which contain several ethylenic double bonds are employed, and in the preferred embodiment at least a part of these double bonds should be present in a conjugated arrangement.

The following are, for example, suitable alcohols containing ethylenic double bonds: allyl alcohol, geraniol, farnesol, soya alcohol, linseed oil alcohol and other similar alcohols with three to 20 C atoms.

The etherification is here performed by heating, preferably in the presence of catalysts, in such a way that the hydroxyl groups of the unsaturated monoalcohols are always present in excess over the epoxide groups of the compounds carrying epoxides. To the extent that the unsaturated monoalcohols are volatile, it is advisable to use a very considerable excess (up to 20 hydroxyl groups per epoxide group) in the reaction and to remove the excess of unreacted unsaturated alcohol subsequently, for example by distillation. In the case of non-volatile unsaturated alcohols, it is advantageous to choose the excess not as high as this. Here, however, at least 1.2 hydroxyl groups should be present per epoxide group. In principle it is also possible to work at such quantity ratios of unsaturated alcohols to compounds carrying epoxide groups as correspond to one epoxide group being employed per hydroxyl group, or at which the epoxide groups are optionally even present in excess over the hydroxyl groups. However, products of very high viscosity are in general produced at the latter kind of quantity ratios and the danger of gelling of the resins cannot be sufficiently reliably excluded.

The etherification is performed by heating the components a (epoxide compound) and b (monohydric alcohol) to temperatures of about 40° to about 150° C, with the temperature range of 60° to 120° C being preferred. Working with etherification catalysts is preferred. For example, boron trifluoride adducts, for example boron trifluoride-diethyl ether, organic tin compounds, for example dibutyl tin dilaurate, and quaternary ammonium compounds, for example trimethylbenzylammonium chloride can be used as catalysts for this. The etherification products arising in this reaction must still be soluble in organic solvents such as methyl isobutyl ketone, xylene, toluene and glycol ethers such as butyl glycol or isobutyl glycol. The etherification can be carried out in the absence of solvents but the presence of inert organic solvents is permissible.

The polyethers obtained are thereafter reacted with $\alpha,\beta$-ethylenically unsaturated monocarboxylic acids and/or polycarboxylic acids with warming. The reaction can at the same time also take place in a mixture with other vinyl or vinylidene monomers which do not carry any carboxyl groups. The following are possible vinyl monomers which do not carry any carboxyl groups: alkyl esters of the $\alpha,\beta$-unsaturated monocarboxylic acids such as methyl acrylate, ethyl acrylate, propyl acrylate, butyl acrylate, octyl acrylate, 2-ethylhexyl acrylate, decyl acrylate and lauryl acrylate, as well as the corresponding methyl-, ethyl- and phenyl-acrylates, propyl crotonate, butyl crotonate and the like. Further possibilities are: hydroxyalkyl esters of the $\alpha,\beta$-unsaturated carboxylic acids such as 2-hydroxyethyl acrylate, 2-hydroxypropyl acrylate, 2-hydroxybutyl acrylate, 3-hydroxybutyl acrylate, 6-hydroxyhexyl acrylate and the corresponding methacrylates, ethacrylates, or phenylacrylates, 2-hydroxyethyl maleate, di-(2-hydroxypropyl)-maleate or the corresponding fumarates, 2-hydroxy-3-chloropropyl acrylate, 2-hydroxy-1-pheynlethyl acrylate, 2-hydroxy-3-butoxypropyl acrylate and the corresponding ethacrylates and phenylacrylates, but also other copolymerizable vinyl and vinylidene compounds such as styrene, nuclear-substituted styrenes, styrenes substituted in the side chain, such as $\alpha$-methyl-styrene, $\alpha$-ethylstyrene, $\alpha$-chlorostyrene and the like. Of these monomers, the following are preferentially employed: methyl acrylate, methyl methacrylate, ethyl acrylate, ethyl methacrylate, 2-hydroxyethyl acrylate, 2-hydroxypropyl acrylate, as well as styrene, $\alpha$-methylstyrene and vinyltoluene, by themselves or as mixtures.

Suitable monomers carrying carboxyl groups are: acrylic acid, methacrylic acid, cinnamic acid, $\beta$-benzoylacrylic acid, or crotonic acid; also $\alpha,\beta$-ethylenically unsaturated polycarboxylic acids or their anhydrides, to the extent that they are capable of forming these, such as maleic acid, fumaric acid, citraconic acid, itaconic acid, methaconic acid, aconitic acid or monoesters of the above-mentioned polycarboxylic acids with saturated straight chain monoalcohols having one to four carbon atoms, preferably methanol, maleic acid monomethyl ester, halogen-substituted acids such as chloromaleic acid and the like. The preferred $\alpha,\beta$-ethylenically unsaturated carboxylic acids include: acrylic acid, methacrylic acid, maleic anhydride, maleic acid and fumaric acid.

The monomers carrying carboxyl groups can be reacted by themselves mixed with one another, by themselves mixed with the first-mentioned monomers which do not carry any carboxyl groups, or as mixtures with these, with the etherification product from stage b (the etherified product of the epoxide compound and the unsaturated monohydric alcohol). Other copolymerizable monomers, such as acrylamide, methacrylamide, acrylonitrile, methacrylonitrile and similar substances can be added as admixtures to the monomer mixture, individually or as a mixture. The proportion of vinyl and/or vinylidene in the synthetic resin depends on the envisaged field of use of the binder. It should, however, in general not be less than 10 percent by weight relative to the weight of the end product. End products which contain 10 to 30 percent by weight of copolymerized vinyl and/or vinylidene compounds are particularly suitable for lacquer coating materials which are applied by the electrophoretic application process. In the case of such binders particular care must be taken that the reaction with the copolymerizable monomers is complete, that is to say that the residual monomeric constituent is very slight. If the residual monomeric constituent is too high, difficulties on deposition and as regards pigment compatibility arise. Binders which contain 30 to 50 percent by weight of vinyl or vinylidene compounds are especially suitable for use as air-drying coating compositions. If the reaction is carried out with $\alpha,\beta$-ethylenically unsaturated monocarboxylic acids, the conjoint use of larger proportions of vinyl and/or vinylidene compounds without carboxyl groups is preferred in such a case. The proportion of monocarboxylic acids should in general be not more that 30 percent by weight relative to the monomer mixture, since the resulting end products otherwise tend to gel and precipitates can relatively easily form during manufacture.

In the case of the reaction of $\alpha,\beta$-ethylenically unsaturated dicarboxylic acids and/or their partial esters the reaction is also satisfactorily carried out without the conjoint use of vinyl and/or vinylidene compounds which do not carry carboxyl groups. It is however advantageous, especially when using dicarboxylic acids which are relatively strong acids, that is to say which have pK values of less than 4, to block all hydroxyl groups of the polyether before the reaction with the polyethers since otherwise an esterification during the copolymerization is not excluded. This blocking of the hydroxyl groups can be effected by reaction with acid anhydrides such as acetic anhydride and the like, or also by reaction with isocyanates such as for example toluene-diisocyanates, which react easily with hydroxyl groups. When using more weakly acid $\alpha,\beta$-ethylenically unsaturated carboxylic acids this danger does exist. The reaction of the polyethers with the monomers carrying carboxyl groups for copolymerization purposes takes place with warming, preferably under the influence of polymerization catalysts. The reaction temperatures depend on the catalyst system employed. Reaction temperatures between 120° and 180° C are preferred as the most advantageous ranges, using di-tert.-butyl peroxide, optionally in combination with chain stoppers, preferably lauryl mercaptan. When using low temperatures, say about 120° C, the reaction mixture is frequently too highly viscous for ease of use. Furthermore, the reaction speed, which can be followed through the rise in the solids content, is rather slow in the case of many monomers. When using high temperatures, say above 180° C, products of low viscosity are obtained even on purely thermal copolymerization. Particularly when using $\alpha,\beta$-ethylenically unsaturated dicarboxylic acids or their anhydrides it is advantageous to carry out the copolymerization without the use of a polymerization catalyst, merely by the action of heat, at 180° to 220° C. The reaction speed can be increased by adding cobalt (II) salts, for example cobalt (II) chloride, in amounts of 3 to 6 parts per million. The same reaction times are however also achieved by the presence of stainless steel material. The reaction can also be carried out in suitable solvents. As such solvents, ethers of ethylene glycol, such as ethyl glycol, isopropyl glycol or butyl glycol are especially suitable. Aromatic solvents such as xylene, toluene or benzene can admittedly also be used but must generally again be removed after completion of the reaction.

The viscosities of reaction products should be between 95 to 800 cP measured 1:1 in butyl glycol at 20° C. This can be achieved firstly through appropriate choice of the monomer mixture and further through controlling the viscosity by the temperature and by the use of appropriate solvents. Furthermore, the viscosity can also be controlled conjointly by adding so-called regulators, as has already been explained above. Reaction products are then converted to their salts by adding ammonia and/or strong organic nitrogen bases such as for example trimethylamine, triethanolamine, triisopropanolamine, diglycollamine, diethylamine, piperidine, morpholine, diethanolamine, N-dimethylethanolamine, N-methylethanolamine and the like.

By strong organic nitrogen bases there are here to be understood secondary or tertiary amines which reach a pH value of at least 9 in 50 percent strength aqueous solution. At the same time it is not necessary to neutralize the carboxyl groups of the reaction product completely; instead it suffices to add such an amount of amine that the products are at least capable of dilution with water. It is advantageous to effect the dilution with water in the presence of so-called hydrophilic solvents. Suitable hydrophilic solvents of this kind are: ethers of ethylene glycol, such as ethyl glycol, isopropyl glycol and butyl glycol, and also ethers of diethylene glycol such as diethylene glycol diethyl ethers and diethylene glycol dimethyl ether, but also alcohols such as methanol, ethanol, propanols, butanols, sec.-butanol, tert.-butanol and also ketone alcohols such as diacetone-alcohol.

The invention also relates to the new vinyl-modified synthetic resins based on polyethers and capable of dilution with water, as such, obtained according to the invention.

The invention furthermore relates to the use of the new polyether resins in binders or coating materials which can be diluted with water, as sole binders or mixed with other binders, for stoving lacquers. A preferred use of the new polyether resins is the use of sole binders or mixed with other binders in coating compositions which can be deposited electrophoretically. A further preferred embodiment consists in the use of the new synthetic resins as binders for air drying coating compositions.

The coating compositions used in accordance with the invention can be unpigmented or pigmented and/or contain fillers. They can for example be applied to timber, concrete, brickwork, plaster or also iron and steel, as well as to non-ferrous metals, with or without pretreatment such as passivation, phosphatization, electrochemical treatment, galvanizing, tin-plating or other metallizations, according to various processes including the electrophoretic method of application. Pigments and/or fillers are for example — without thereby restricting the invention — red iron oxide, carbon black, lead silico-chromate, strontium chromate, blanc fix, micronized varieties of baryte, microtalc, colloidal chalk, diatomaceous earth, china clay, titanium dioxide, chromium oxide and others.

The use of strongly basic pigments such as zinc oxide, zinc chromate, lead carbonate, basic lead sulfate, red lead or calcium plumbate requires precise testing. These pigments can tend towards thickening or precipitation. The binders used according to the invention can be stoved at an elevated temperature. When used as stoving lacquers, it can be advantageous to admix water-soluble or at least hydrophilic, low molecular aldehyde condensation products, for example phenolresols and/or condensation products which form aminoplasts. Mixing the new water-soluble polyethers with relatively low molecular, at least hydrophilic heat-curable condensation products such as reaction products forming aminoplasts and/or phenolresols and/or etherified phenolresols results in high crosslinking of the stoved coating materials and hence in a further improvement of their technical lacquer properties such as hardness, gloss, corrosion protection and the like.

By heat-curable hydrophilic condensation products there are also to be understood those condensation products which when heated alone reach a state which while being relatively high molecular are however not yet infusible. It is, equally, not absolutely essential that the admixed condensation products should by themselves exhibit solubility in water. It is merely necessary for their hydrophilic character to suffice to result in adequate compatibility in combination with the new water-soluble polyether-acid resins which may act as plasticizers, that is to say, stoved clear lacquer films must be homogeneous, and no separation of the binder constituents must take place in the aqueous coating materials even at the use concentration.

Examples of suitable heat-curable hydrophilic low molecular condensation products are phenol-alcohols and phenol-polyalcohols, that is to say, products which are still low molecular and are obtained by condensation from monohydric or polyhydric phenols with aldehydes such as formaldehyde, acetaldehyde, crotonaldehyde, acrolein, benzaldehyde, furfurol and the like, or compounds which yield formaldehyde such as paraformaldehyde, paraldehyde or trioxymethylene. The preferred aldehyde is formaldehyde or a compound yielding formaldehyde which is obtained in an alkaline medium in a known manner, such as for example hexamethylenetetramine. Suitable phenols are phenol, and phenols which are substituted in the o-, o'-p-position but which can be condensed with formaldehyde, such as cresol or xylenol. Phenols which are obtained from alkylphenol such as propylphenol or butylphenol, especially p-tert.-butylphenol, are very suitable. Further, resols from binuclear phenols such as diphenol and bisphenol A are suitable. In Particular, resols based on bisphenol A which contain about 1.75 to 2.5 moles of formaldehyde as an adduct per mole of bisphenol A are suitable. Phenolcarboxylic acids which have been obtained by condensation of formaldehyde or compounds yielding formaldehyde with suitable phenolcarboxylic acids can also be very well used as resols. Among the phenolcarboxylic acids which can be condensed with formaldehyde, 4,4-bis(4-hydroxyphenol)-valeric acid occupies a preferred position. The most advantageous results are here again obtained if 1.75 to 2.5 moles of formaldehyde are bonded per mole of phenolcarboxylic acid. The manufacture of further suitable phenolcarboxylic acid resols is for example described in German Published Specification 1,113,775.

The phenolcarboxylic acid resols, especially those based on 4,4-bis(hydroxyphenyl)-valeric acid, are well suited for combination purposes for the products according to the invention, which are intended to be used according to the invention as coating compositions and lacquer binders which can be deposited electrophoretically. It is very advantageous for at least a part of the formaldehyde condensation products to be etherified with low monohydric aliphatic alcohols with one to four carbon atoms such as ethanol, methanol, propanols or butanols. Preferred phenolresols which can be diluted with water are those which have been obtained by reaction of alcohol-etherified phenolaldehyde condensation products with aliphatic monohydroxycarboxylic acids or dihydroxycarboxylic acids or their esters, and which are described in U.S. application, Ser. No. 780,583.

Heat-curable hydrophilic low molecular condensation products which form aminoplasts are aldehyde reaction products of such compounds capable of reaction with aldehydes as urea, ethyleneurea, dicyandiamide and aminotriazines such as melamine, benzoguanamine, acetoguanamine and formoguanamine. The above-mentioned compounds may have been reacted with aldehydes such as formaldehyde, acetaldehyde, crotonaldehyde, acrolein, benzaldehyde, furfurol and the like. As aldehydes there are also to be understood aldehyde-forming compounds such as paraformaldehyde, paraldehyde and trioxymethylene. The preferred aldehyde is formaldehyde; preferred aldehyde-binding compounds are melamine and urea. The reaction takes place in the usual molar ratios, for example in a usual formaldehyde molar ratio of 1:1.5 to 1:4 in the case of urea resins, and in a formaldehyde molar ratio of 1:1.5 to 1:6 in the case of melamine resins. The condensation products which form aminoplasts are preferably employed in a partially or completely alkylated or alcohol-modified form. The etherification products of the low half ethers of glycol and diglycol such as ethyl glycol or ethyl diglycol with methylolmelamine, such as have already been described in Austrian Pat. No. 180,407 and the corresponding Australian Pat. No. 150,863, have also proved successful in the present instance. The most preferred position is occupied by low molecular condensation products of melamine with formaldehyde in a melamine/formaldehyde ration of 1:4 to 1:6, which have been almost completely etherified with methanol. Ethers of nitrogen-containing polymethylol compounds which are partially esterified with dicarboxylic acids, such as are for example obtained by trans-esterification of hexamethoxymelamine with adipic acid, are also suitable.

It is especially preferred to employ such melamine resin condensation products capable of dilution with water as have been obtained by reaction of alcohol-etherified aminotriazine-formaldehyde condensation products containing at least 1 mole of volatile alcohol residue in the ether bond, with aliphatic hydroxycarboxylic acid esters by warming, and which have been described in French Pat. No. 1,544,219 which is based upon German applications R 44295, R 45194, R 45195, R 45196 and R 45852.

Combinations of the new polyether-carboxylic acid resins in which condensation products forming aminoplasts or forming phenoplasts are present to the extent of 10 to 30 percent by weight relative to the solids content are preferred.

For the electrophoretic method of application, it is advantageous for the heat-curable condensation products of the nature already explained above, namely phenoplasts and/or aminoplasts, not merely to be admixed but for the components to be subjected to a reaction. The reaction, which can be described as a precondensation, in general takes place at temperatures of 100° to 150° C, and care should be taken as far as possible, through appropriately carrying out the reaction, that a polyetherification and not an esterification of the components should take place. A suitable conduct of the reaction for example consists of carrying out the reaction of the components in the presence of an acid catalyst, such as phosphoric acids, p-toluenesulphonic acid or benzoic acid, at temperatures between 100° and 150° C. At the same time heating is immediately stopped when the acid number has dropped by about 10 units, compared to the initial value of the acid number of the reaction mixture. This can preferably be achieved by employing etherified hydrophilic heat-curable condensation products as phenoplasts and/or aminoplasts. In order to achieve adequate trans-etherification, it is also advantageous to carry out the reaction in vacuo.

The combined stoving lacquers can be applied to the articles to be lacquered using the usual methods; they are above all suitable for the lacquering of sheet metals. Here it is a particular advantage of the lacquers that they can also be deposited on the sheet metals by the electrophoresis process. The stoving of the lacquers can take place at temperatures of about 80 to 200, preferably about 100° to 180° C, and over a period of about 10 to 80, preferably of about 20 to 60 minutes depending on the stoving temperature.

The lacquers can, if desired, and practically in all cases, advantageously contain, as an additional component, at least one additive resin which is soluble in the lacquer system, which differs from the polyether resin and which is usual in relevant stoving lacquers capable of dilution with water, with care having to be taken as to compatibility when choosing the nature and amount of the additive resin.

When using the resin combination according to the invention as binders for stoving lacquers, an addition of compounds containing hydroxyl groups, especially amines containing hydroxyl groups, preferably polyamines, has an advantageous effect. In a particular embodiment, the coating materials according to the invention contain, as strong organic nitrogen bases, at least one compound according to the general formula:

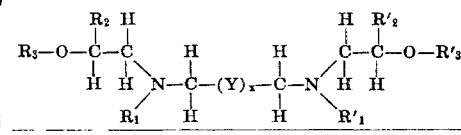

wherein the substituents and symbols have the following significance:

$Y = CH_2-, C_2H_4-, C_3H_6-, C_4H_8-, CH_2-\underset{R_1}{N}-CH_2-;$ $R_1 = H-, CH_3-, C_2H_5-, CH_2-\underset{H}{\overset{R_2}{C}}-O-R_3;$ $R'_1 = H-, CH_3-, C_2H_5-, CH_2-\underset{H}{\overset{R_2}{C}}-O-R_3;$ $R_2 = H-, CH_3-, C_2H_5-;$ $R'_2 = H-, CH_3-, C_2H_5-;$ $R_3 = H-, (CH_2-CH_2-O-)_x-H, -(CH_2-\underset{H}{\overset{CH_3}{C}}-O)_x-H$ and $R'_3 = H-, -(CH_2-CH_2-O)_x-H, -(CH_2-\underset{H}{\overset{CH_3}{C}}-O)_x-H$ and $x$ = zero or an integer between 1 and 6.

Those polyhydroxypolyamines according to the above general formula which are characterized by complete substitution of the hydrogen atoms of polyamines by the 2-hydroxypropyl residue, especially the polyhydroxypolyamines obtained by exhaustive reaction of diethylene-triamine and diethylenetetramine with propylene oxide, are preferred. The manufacture of the above-mentioned polyhydroxypolamines is described in French Pat. No. 1,497,222.

Specific examples of the compounds of the general formula are: N,N'-bis-(2-hydroxypropyl)-ethylenediamine; N,N'-bis-(hydroxyethyl)-ethylenediamine; N,N,N'-tris-(2-hydroxypropyl)-ethylenediamine; N,N,N',N'-tetrakis-(2-hydroxypropyl)-ethylenediamine: N,N,N',N'-tetrakis-(hydroxyethyl)-ethylenediamine; N,N,N',N'-tetrakis-(2-hydroxypropyl)-hexamethylene-diamine; N,N'-bis-(2-hydroxypropyl)-hexamethylenediamine; N,N,N'N',N''-pentakis-(2-hydroxypropyl)-diethylene; and N,N,N',N,N'',N'-hexakis-(2-hydroxypropyl)-triethylene tetramine.

Preferred examples of the overall combination of components a (epoxide compound), b (unsaturated monohydric alcohol, c(carboxylic compound) and d (amine compound) are: epoxide resin with an equivalent weight of 240 to 290, a viscosity of 500 to 1,000 cP, a refractive index of 1.5830 and obtained by condensation of bisphenol A with epichlorhydrin (hereinafter referred to as Epoxy 1)/soya fatty alcohol/acrylic acid and styrene/triethylamine; Epoxy 1/linseed oil fatty alcohol/styrene and acrylic acid/triethylamine; Epoxy 1/linseed oil fatty alcohol/vinyltoluene and acrylic acid/ammonia; epoxide resin with an equivalent weight between 180 and 190, a viscosity of 6,000 to 10 000 cP, measured at 25° C, a refractive index of 1.5710 and obtained by condensation of bisphenol A with epichlorhydrin (hereinafter referred to as Epoxy 2)/ linseed oil alcohol/maleic acid monomethyl ester and styrene/ammonia; Epoxy 2/soja fatty alcohol/butyl acrylate, styrene and methacrylic acid/diisopropanolamine; epoxide resin with an equivalent weight of 370 to 440 and a softening point of 52° to 56° C, obtained by condensation of bisphenol A with epichlorhydrin (hereinafter referred to as Epoxy 3)/allyl alcohol/ butyl acrylate and acrylic acid/dimethylethanolamine; Epoxy 3/allyl alcohol/butyl acrylate, styrene and acrylic acid/triethylamine. epoxide resin with an equivalent weight of 450 to 525, a softening point of 65° to 75° C, obtained in the usual way by condensation of bisphenol A (hereinafter referred to as Epoxy 4)/soja oil alcohol/styrene and acrylic acid/dimethylethanolamine; Epoxy 2 by which one epoxy group per mole is etherified with butanole/linseed oil alcohol/styrene and acrylic acid/ammonia.

The vinyl-modified polyethers according to the invention can also be used for the manufacture of air drying lacquers. In this case it is necessary to add driers to the lacquers. Suitable driers are compounds of cobalt, lead, manganese and the like known to be relevant for the manufacture of lacquers. Those which can be dispersed in water are preferred.

The air drying lacquers can if desired, and practically in all cases, advantageously contain, as an additional component, at least one additive resin which is soluble in the lacquer system, which is different from the oxidatively drying carboxylic acid resin and which is usual in relevant air drying lacquers which can be diluted with water, attention having to be given to compatibility when choosing the nature and amount of the additive resin.

It has proved appropriate in some cases to mix the vinyl-modified polyethers according to the invention, which can be diluted with water, with dispersions based on styrene-butadine copolymers, vinyl acetate homopolymers and vinyl acetate copolymers as well as pure acrylate copolymers, either individually or as mixtures. The quantity ratios between the dispersion and the coating compositions according to the invention can be 5 to 95 or 95 to 5 percent by weight.

Without further elaboration, it is believed that one skilled in the art can, using the preceding description, utilize the present invention to its fullest extent.

EXAMPLE 1.

260 g of soya fatty alcohol and 0.6 g of a 40 percent strength solution of boron trifluoride in either are dissolved in 150 g of dioxane. A solution of 280 g of an epoxide resin with an epoxide equivalent weight of 240 to 290, a viscosity of 500 to 1,000 cP, measured at 70 percent strength in butyl glycol at 25° C, and a refractive index of 1.5830, which was obtained in a known manner by condensation of bisphenol A with epichlorhydrin, in 150 g of dioxane is added dropwise to the preceding solution at 80° C. After completion of the addition the mixture is kept for a further hour at 80° C. The dioxane is then removed by vacuum distillation. A mixture of 127 g of styrene, 33 g of acrylic acid, 6 g of di-tert.-butyl peroxide and 6 g of lauryl mercaptan is added dropwise to the residue at 150° C over the course of 2.5 hours. After completion of the addition the mixture is kept at 150° C until the solids content has reached 98 percent by weight. The remainder of the unreacted monomers is then removed by vacuum distillation. The product has a viscosity of 250 cP, measured 1:1 in butyl glycol at 20° C, and an acid number of 32. It is diluted to a solids content of 80 percent by weight with isopropyl glycol. The resin neutralized with triethylamine can be infinitely diluted with water. The resin is suitable for use as a sole binder for the electrophoretic method of application.

EXAMPLE 2.

250 g of linseed oil fatty alcohol and 210 g of the epoxide resin described in Example 1 are mixed with one another. A solution of 0.6 g of a 40 percent strength boron trifluoride solution in ether in 30 g of linseed oil alcohol, is added thereto at 40° C. The mixture is then kept for 2 hours at 80° C. A mixture of 122 g of styrene, 32 g of acrylic acid and 5.8 g of di-tert.-butyl peroxide and 7.7 g of lauryl mercaptan is added dropwise to the resulting product at 150° C over the course of 2 ½ hours. The mixture is then kept at 150° C until the solids content has reached 98 percent by weight. The remainder of the unreacted monomers is then removed by vacuum distillation. The product has a viscosity of 150 cP, measured 1:1 in butyl glycol at 20° C, and an acid number of 30. It is diluted to a solids content of 80 percent by weight with isopropyl glycol. The resin which has been neutralized with triethylamine can be infinitely diluted with water.

EXAMPLE 3.

250 g of linseed oil fatty alcohol and 210 g of the epoxide resin described in Example 1 are mixed with one another. A solution of 0.6 g of a 40 percent strength solution of boron trifluoride in ether in 30 g of linseed oil alcohol, is added thereto at 40° C. The mixture is then kept for 2 hours at 80° C. Thereafter a mixture of 272 g of vinyltoluene, 68.5 g of acrylic acid, 9.8 g of di-tert.-butyl peroxide and 9.8 g of lauryl mercaptan is added dropwise to the reaction product at 150° C over the course of 3 hours. The reaction mixture is then kept at 150° C until the solids content has reached 98 percent by weight. The remainder of the unreacted monomers is removed by vacuum distillation. The product is diluted to a solids content of 70 percent by weight with butyl glycol.

EXAMPLE 4.

The resin obtained according to Example 3 is neutralized with concentrated ammonia solution and diluted with water to 40 percent by weight solids content. Drier is added to the solution in the form of cobalt drier (Cyclodex), using 0.1 percent by weight of cobalt calculated relative to solid resin. A film applied at a coating thickness of 90 μ to a glass plate is dust-dry within 2 hours. In the pigmented state the coating composition is extremely suitable for corrosion protection primers and is distinguished by great resistance to salt spray mist. The pH value of the solution applied is 9.5. After 21 days storage at 50° C the pH value was 9.4. The drying properties of the product had not changed during this period of time.

EXAMPLE 5.

250 g of linseed oil fatty alcohol and 210 g of the epoxide resin described in Example 1 are mixed with one another. A solution of 0.6 g of a 40 percent strength solution of boron trifluoride in ether in 30 g of linseed oil alcohol is added thereto at 40° C. The mixture is then kept for 2 hours at 80° C. 68.6 g of fumaric acid are added to this reaction product. A mixture of 272 g of vinyltoluene, 9.8 g of di-tert.-butyl peroxide and 9.8 g of lauryl mercaptan is then added dropwise at 150° C over the course of 3 hours. The mix is then kept at 150° C until the solids content has reached 98 percent by weight. The resin must in the course thereof have become clear. The resin has an acid number of 48 and a viscosity of 800 cP measured 1:1 in butyl glycol at 20° C. It is diluted to a solids content of 70 percent by weight with butyl glycol and is suitable for use as a sole binder for air drying coating materials.

EXAMPLE 6.

250 g of linseed oil alcohol and 160 g of an epoxide resin with an epoxide equivalent of between 180 and 190, a viscosity of 6,000 to 10,000 cP measured at 25° C, and a refractive index of 1.5710, which was obtained in a known manner by condensation of epichlorhydrin with bisphenol A, are mixed with one another. A solution of 0.6 g of a 40 percent strength ether solution of boron trifluoride in 30 g of linseed oil alcohol is added thereto at 40° C. The mixture is then kept for 2 hours at 80° C. 90 g of maleic acid monomethyl ester are added to this reaction product. A mixture of 216 g of styrene, 8 g of di-tert.-butyl peroxide and 8 g of lauryl mercaptan is then added dropwise at 150° C. The mix is kept at 150° C until the solids content has reached 98 percent by weight. Unreacted monomers are removed by vacuum distillation. The clear resin has a viscosity of 500 cP measured at 20° C, 1:1 in butyl glycol. In the neutralized form it is infinitely diluted with water and is suitable for use as a sole binder for air drying coating compositions.

EXAMPLE 7.

The resin obtained according to Example 1 is mixed with a phenolic resin-ether-carboxylic acid described in U.S. application, Ser. No. 780,583, Example 2, in the ratio of 7:3 relative to the solids content. The manufacture of the phenolic resin-carboxylic acid is described below. The resin mixture is neutralized with triethylamine and diluted with water to a solids content of 40 percent by weight. The paste is then ground in a ceramic ball mill with Kronos RN 59 titanium dioxide (Titangesellschaft) in such a way that the pigment-binder ratio is 0.5:1. Thereafter the paste is diluted with water to a solids content of 10 percent by weight. The solution is introduced into a 10×10×18 cm steel basin and passivized steel sheets (Bonder 1024 Metallgesellschaft) are coated therein by applying an electric direct potential at 110 volts. The sheets are then stoved for 30 minutes at 170° C and extremely hard resistant coatings are produced.

Manufacture of the etherified phenolresol 686.5 g of p-tert.- butyl phenolresol are dehydrated in vacuo up to 90° C, and 1650 g of n-butanol and 835.0 g of toluene are then added. The mixture is heated to boiling and the water is removed by azeotropic distillation, with the solvent mixture being returned into the reaction vessel. After removal of about 40 g of water, 8.0 g of 85 percent strength phosphoric acid are added and the azeotropic distillation is continued until no further water passes over. Thereafter the acid is neutralized with calcium hydroxide added in the solid form. The product is concentrated in vacuo up to a temperature of 110° C and is then filtered. The solids content is about 92 percent by weight.

Manufacture of the phenolic resin-carboxylic acid 340 g of etherified phenolresol obtained as described above and 70 g of dimethylolpropionic acid are mixed and heated in vacuo to 150° – 160° C and kept thereat until about 100 g of distillate (butanol) have passed over. The product then has a viscosity of 150 cP measured 1:1 in butyl glycol at 20° C, and an acid number of 90.

The product is diluted to 80 percent solids content with isopropyl glycol. At pH 8.5 the neutralized resin can be infinitely diluted with water.

EXAMPLE 8.

The resin obtained according to Example 1 is mixed with an anionic melamine resin according to Example 2, as described in the priority document of German Pat. application R 45195 and as disclosed in French Pat. No. 1,544,219 in the ratio of 8:2. This mixture is pigmented as described in Example 7 of this invention and is deposited electrophoretically, again as described there. The sheets are stoved for 30 minutes at 150° C. Hard coatings of a relatively bright gloss are produced.

Manufacture of the anionic melamine resin 390 g of hexamethoxymethylmelamine, 150 g of n-butanol and 140 g of glycollic acid butyl ester are mixed and 0.1 g of p-toluenesulphonic acid is added as the catalyst. The mixture is heated to 100° – 110° C until no further distillate passes over. A vacuum is then applied and the unreacted proportion of alcohol and ester is distilled off. Thereafter 100 ml of 5 N NaOH and 100 ml of water are added. The mixture is boiled for 1 hour under reflux. The water is then removed by azeotropic distillation with benzene as the entraining agent. Thereafter the benzene is distilled off in vacuo and a solution of 30 g of oxalic acid in 100 g of acetone is added to the mixture at 30° C. This mixture is well stirred and subsequently filtered. The resin is then neutralized with triethylamine. It can be infinitely diluted with water and can be used for electrophoretic lacquering.

EXAMPLE 9.

160 g of the resin described in Example 3 are manufactured, but here the resin is not diluted with butyl glycol as described there, but instead 43.5 g of the etherified phenolresol of which the manufacture is described in Example 7 are added. 1 g of a 40 percent strength isobutanol solution of 80 percent pure phosphoric acid is added and the mixture is heated to 140° C in vacuo and kept at this temperature until the acid number has reached about 42 and the viscosity is 150 cP measured 1:1 in butyl glycol at 20° C. The resin is then diluted to 80 percent strength with diacetone-alcohol and neutralized with diisopropanolamine to a pH value of about 8. It is suitable for use as a sole binder for electrophoretic lacquering.

EXAMPLE 10.

The resin combination described in Example 9 is neutralized with N,N,N',N'-tetrakis-(2-hydroxypropyl)-ethylenediamine instead of being neutralized with diisopropanolamine. The resin is well suited for spray primers and can be stoved in thick layers without spitting.

EXAMPLE 11.

160 g of the resin described in Example 5 are manufactured but the resin is not diluted with butyl glycol as described there and instead 40 g of hexamethoxymethyl-melamine are admixed. 0.1 g of p-toluenesulphonic acid is added and the mixture is heated to 120° C in vacul. As soon as the acid number has dropped to 35, the resin is diluted with isopropyl glycol to a solids content of 80 percent and is neutralized with diisopropanolamine. The resin is suitable for electrophoretic lacquering for the production of the light-colored coatings.

EXAMPLE 12.

740 g of an epoxide resin with an epoxide equivalent of weight of from 370 to 440 and a melting point of from 50° to 56° C, which was prepared from epichlorhydrin and bisphenol A, were dissolved in 1,200 g of allyl alcohol. To this solution was added at 80° C a mixture of 280 g of allyl alcohol and 2 g of a 40 percent ether solution of boron trifluoride. The resulting mixture was heated under reflux for 1 hour. Then the unreated allyl alcohol was removed by vacuum distillation. 100 g of the reaction product was mixed with 260 g of styrene, 40 g of acrylic acid and 120 g of 2-ethylhexyl-acrylate. Then 250 g of butanol were added. A mixture of 36 g of cumene hydroperoxide, 30 g of lauryl mercaptan and 25 g of butanol was gradually added at 110 ° C over the course of 2 hours. The reaction mixture was held at 110°C until the solids content reached 68 percent. Finally the butanol was removed by vacuum distillation. The resin so obtained was mixed in the ratio of 8:2 with hexamethoxymethylmelamine and held at 100° C for 1 hour to effect reaction. The resin condensate was thinned with isopropyl glycol to a solids content of 70 percent and after neutralization with triethalamine was suitable as a binder material for surface coatings to be applied by the electrophoretic method of application.

EXAMPLE 13.

700 g of an epoxide resin with an epoxide equivalent weight of 240 to 290, a viscosity of 500 to 1,000 cP measured at a 70 percent solution in butyl glycol at 25° C and having refractive index of 1.5830, which was prepared by condensation of bisphenol A with epichlorhydrin were dissolved in 1400 g of allyl alcohol. A mixture of 3.25 g of a 40 percent ether solution of boron trifluoride and 325 g of allyl alcohol was added. The mixture was heated for a hour under reflux and the unreacted allyl alcohol was removed by vacuum distillation. 250 g of the reaction product was dissolved in 107 g of butyl glycol. A mixture of 44 g of styrene, 44 g of 2-ethylhexylacrylate, 22 g of acrylic acid, 8 g of di-tert.-butyl peroxide and 8 g of lauryl mercaptan were added gradually at 130° C over the course of 2 hours. The reaction temperature was held at 130° C until the solids content reached 78 percent. The resin obtained as the end product is, after neutralization with triethalamine, infinitely water-dilutable.

EXAMPLE 14.

400 g of the unneutralized resin obtained according to Example 13 was mixed with 100 g of the etherified phenolresol described in Example 7. The mixture was held at 120° C under vacuum for 1 hour to bring about reaction. The resin condensate was then diluted with isopropyl glycol to a solids content of 80 percent. The product after neutralization with amine is useful as a binder material for surface coatings which are to be applied by the electrophoretic process of application.

The resins described in Examples 1, 2, 3, 5, 6, 7 and 14 are employed for the most part as electrophoretically applied corrosion resistant primers. However, the resins obtained according to Examples 1, 2, 3, 4, 5 and 6 are used also as binder materials for air drying surface coating compositions exhibiting good corrosion resistance properties. The resins described in Examples 8, 11 and 12 are employed as binder materials for the preparation of electrophoretic, light colored coating compositions having good weathering properties.

The preceding examples can be repeated with similar success by substituting the generically and specifically described reactants and operating conditions of this invention for those used in the preceding examples.

I claim:

1. A process for the production of vinyl-modified polyether resins by etherifying an epoxide compound with an unsaturated monohydric alcohol containing at least one ethylenic double bond, copolymerizing the etherified product through its centers of unsaturation with an α,β-ethylenically unsaturated carboxylic compound the improvement comprising neutralizing the copolymer using ammonia or strong organic nitrogen bases in order to obtain a water-soluble epoxy resin ester characterized in that a. the employed epoxides correspond to the overall formula

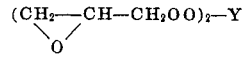

and

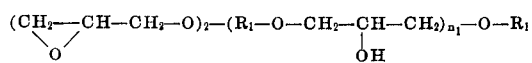

wherein Y is an alkylene, arylene or cycloalkylene group, $n_1$ is 0 or a small integer and $R_1$ is in aliphatic or aromatic group, b. the unsaturated monohydric alcohol is selected from the group consisting of allyl alcohol, geraniol, farnesol, soya alcohol and linseed oil alcohol, and c. the unsaturated monohydric alcohol is employed in such amounts that at least 1.2 hydroxyl groups but not more than 20 hydroxyl groups are present per epoxide group in the epoxide compound, d. the carboxylic compound is selected from the group consisting of α,β-ethylenically unsaturated monocarboxylic acids, poly-carboxylic acids, monocarboxylic anhydrides, polycarboxylic anhydrides, half esters of polycarboxylic acids with monoalcohols having one to four carbon atoms, half esters of monocarboxylic acids with monoalcohols having one to four carbon atoms, and mixtures thereof, and the copolymerization reaction is carried out with heating so that the reaction products have an acid number of at least 25, and e. the neutralization is carried out in the presence of a basic compound selected from the group consisting of ammonia, strong organic nitrogen bases or mixtures thereof so that the reaction products are dispersible in or dilutable with water.

f. the end products have viscosities of 95 to 800 cP measured 1 : 1 in n-butyl-glycol at 20° C.

2. The process of claim 1, wherein the etherification takes place in the temperature range of 40° to 150° C in the presence of a usual etherification catalyst.

3. The process of claim 1, further comprising copolymerizing the α,β-ethylenically unsaturated carboxylic compound in the presence of compounds selected from the groups consisting of vinyl compounds, vinylidene compounds and mixtures thereof.

4. The process of claim 3, wherein said vinyl or vinylidene compounds are selected from the group consisting of methyl acrylate, methyl methacrylate, ethyl acrylate, ethyl methacrylate, p-hydroxyethyl acrylate, 2-hydroxypropyl acrylate, styrene, α-methyl styrene and vinyl toluene.

5. The process of claim 1, wherein the epoxide compound has a molecular weight of less than about 3,500.

6. The process of claim 5, wherein the epoxide compound has the general formula

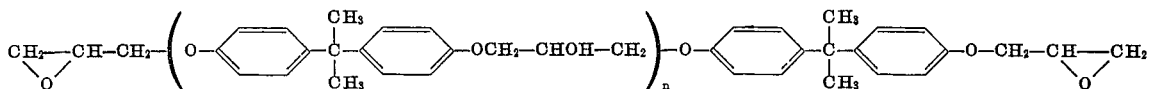

wherein n is an integer and the compound has a molecular weight between about 380 and about 3,500.

7. The process of claim 1, wherein the α,β-ethylenically unsaturated acid is selected from the group consisting of acrylic acid, methacrylic acid, cinnamic acid, β-benzoylacrylic acid, crotonic acid, maleic acid, fumaric acid, citraconic acid, itaconic acid, methaconic acid, aconitic acid and chloromaleic acid.

8. The product obtained by the process of claim 1.

9. The process of claim 1, wherein the copolymerizing takes place in the temperature range of 120° to 180° C using di-tert.-butylperoxide as polymerization catalyst.

10. The process of claim 1, wherein the copolymerizing takes place in the temperature range of 180° to 220° C without the use of a polymerization catalyst.

11. The process of claim 1, characterized in that 10 to 50 percent by weight of vinyl compounds relative to the weight of the end product are employed for the copolymerization.

* * * * *